US009664501B2

United States Patent
Novak et al.

(10) Patent No.: US 9,664,501 B2
(45) Date of Patent: *May 30, 2017

(54) AUTOMATED RE-FOCUSING OF INTERFEROMETRIC REFERENCE MIRROR

(71) Applicant: BRUKE NANO INC., Santa Barbara, CA (US)

(72) Inventors: Erik Novak, Tucson, AZ (US); Colin Farrell, Tucson, AZ (US); Bryan Guenther, Tucson, AZ (US)

(73) Assignee: BRUKER NANO INC., Santa Barbara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/991,939

(22) Filed: Jan. 9, 2016

(65) Prior Publication Data
US 2016/0123719 A1    May 5, 2016

Related U.S. Application Data

(63) Continuation of application No. 13/925,708, filed on Jun. 24, 2013, now Pat. No. 9,234,814.

(51) Int. Cl.
*G01B 9/02* (2006.01)
*G01M 11/02* (2006.01)

(52) U.S. Cl.
CPC ..... *G01B 9/02063* (2013.01); *G01B 9/02067* (2013.01); *G01B 9/02072* (2013.04); *G01M 11/02* (2013.01)

(58) Field of Classification Search
CPC .............. G01B 9/02035; G01B 9/0207; G01B 9/02072; G01B 2290/60
See application file for complete search history.

(56) References Cited

U.S. PATENT DOCUMENTS 6,545,761 B1 *  4/2003  Aziz ...................... G01B 9/04
356/497

* cited by examiner

*Primary Examiner* — Hwa Lee
(74) *Attorney, Agent, or Firm* — Antonio R. Durando

(57) ABSTRACT

A reference surface is used to develop an empirical plot between a parameter of interest, such as roughness or modulation, and the position of the reference mirror in an interferometer by repeating measurements of the reference surface at different positions of the reference mirror so as to identify the in-focus position of the reference mirror. Serial quality-control measurements of samples of interest are carried out with the reference mirror in such in-focus position until a predetermined quality-control event triggers an automated system re-calibration by re-measuring the reference surface and, if the result does not correspond to the in-focus position of the reference mirror according to the plot, by finding a new in-focus position for the reference mirror using the same plot or, alternatively, a new similarly produced plot. Sample measurements are then resumed with the mirror placed at that new position.

9 Claims, 7 Drawing Sheets

A) - MEASURE A PARAMETER OF INTEREST IN A REFERENCE SURFACE BY SCANNING THROUGH FOCUS

↓

B) - CHANGE THE REFERENCE MIRROR POSITION IN RELATION TO THE OBJECTIVE'S OPTICS

↓

C) - REPEAT STEPS A) AND B) TO DEVELOP A PLOT OF THE PARAMETER OF INTEREST IN THE REFERENCE SURFACE AS A FUNCTION OF REFERENCE-MIRROR POSITION

↓

D) - SELECT A VALUE OF THE PARAMETER OF INTEREST SO MEASURED TO REPRESENT THE IN-FOCUS POSITION OF THE REFERENCE MIRROR AND PLACE THE MIRROR AT THE CORRESPONDING POSITION

↓

E) - PERFORM SAMPLE MEASUREMENTS UNTIL THE OCCURRENCE OF A PREDETERMINED QUALITY-CONTROL EVENT

↓

F) - UPON SUCH OCCURRENCE, RE-MEASURE THE PARAMETER OF INTEREST IN THE REFERENCE SURFACE

↓

G) - IF THE RESULT IS WITHIN AN ACCEPTABLE RANGE OF VALUES REPRESENTING THE IN-FOCUS POSITION OF THE REFERENCE MIRROR, RESUME THE MEASUREMENT OF SAMPLES

↓

H) - IF THE RESULT IS OUTSIDE THE ACCEPTABLE RANGE OF VALUES REPRESENTING THE IN-FOCUS POSITION OF THE REFERENCE MIRROR,

1. REPEAT STEPS A) THROUGH D) WITH A REFERENCE SURFACE TO DETERMINE A NEW IN-FOCUS POSITION OF THE REFERENCE MIRROR AND PLACE THE MIRROR AT THAT POSITION;

2. ALTERNATIVELY, IF THE SAMPLE MEASUREMENT INVOLVES THE SAME PARAMETER OF INTEREST MEASURED IN THE REFERENCE SURFACE, REPOSITION THE REFERENCE MIRROR BASED ON THE PLOT

↓

I) - REPEAT STEPS E) THROUGH H) AS DESIRED

FIG. 3

A) - FOCUS THE OBJECTIVE ON A REFERENCE SURFACE USING AN AUTO-FOCUS MECHANISM AND MEASURE A PARAMETER OF INTEREST IN THE REFERENCE SURFACE USING PSI

B) - CHANGE THE REFERENCE MIRROR POSITION IN RELATION TO THE OBJECTIVE'S OPTICS

C) - REPEAT STEPS A) AND B) TO DEVELOP A PLOT OF THE PARAMETER OF INTEREST IN THE REFERENCE SURFACE AS A FUNCTION OF REFERENCE-MIRROR POSITION

D) - SELECT A VALUE OF THE PARAMETER OF INTEREST SO MEASURED TO REPRESENT THE IN-FOCUS POSITION OF THE REFERENCE MIRROR AND PLACE THE MIRROR AT THE CORRESPONDING POSITION

E) – CARRY OUT SAMPLE MEASUREMENTS BY FIRST FOCUSING ON THE SAMPLE AND THEN PERFORMING PSI UNTIL THE OCCURRENCE OF A PREDETERMINED QUALITY-CONTROL EVENT

F) - UPON SUCH OCCURRENCE, RE-MEASURE THE PARAMETER OF INTEREST IN THE REFERENCE SURFACE

G) - IF THE RESULT IS WITHIN AN ACCEPTABLE RANGE OF VALUES REPRESENTING THE IN-FOCUS POSITION OF THE REFERENCE MIRROR, RESUME THE MEASUREMENT OF SAMPLES

H) - IF THE RESULT IS OUTSIDE THE ACCEPTABLE RANGE OF VALUES REPRESENTING THE IN-FOCUS POSITION OF THE REFERENCE MIRROR,

1. REPEAT STEPS A) THROUGH D) WITH A REFERENCE SURFACE TO DETERMINE A NEW IN-FOCUS POSITION OF THE REFERENCE MIRROR AND PLACE THE MIRROR AT THAT POSITION;

2. ALTERNATIVELY, IF THE SAMPLE MEASUREMENT INVOLVES THE SAME PARAMETER OF INTEREST MEASURED IN THE REFERENCE SURFACE, REPOSITION THE REFERENCE MIRROR BASED ON THE PLOT

I) - REPEAT STEPS E) THROUGH H) AS DESIRED

FIG. 4

AUTOMATED RE-FOCUSING OF INTERFEROMETRIC REFERENCE MIRROR

RELATED APPLICATIONS

This application is a continuation application of U.S. Ser. No. 13/925,708, filed on Jun. 24, 2013, issued as U.S. Pat. No. 9,234,814.

BACKGROUND OF THE INVENTION

Field of the Invention

This invention pertains to the general field of interferometric metrology. In particular, it pertains to an automated method for periodically re-focusing the reference mirror of the interferometer to account for environmental changes during repeated interferometric measurements.

Description of the Prior Art

The interferometric objectives used in the art are usually off-the shelf components (such as produced by Nikon and Olympus) that allow manual adjustments to refocus the objective's reference mirror as needed to account for drift caused by environmental factors, such as temperature, humidity and vibrations. Thus, the process of recalibration of an interferometric instrument is slow and unsuited for online testing of parts for quality-control purposes, where the measured parameters are expected to be essentially the same during repeated measurements.

As is well understood in the art, an interferometric measurement, whether conducted with white-light so-called vertical-scanning interferometry (VSI) or with narrow-band phase-shifting interferometry (PSI), produces acceptable results only if the optical path difference (OPD) between the reference and test arms is zero when the sample surface is in focus. This condition is especially critical for measuring small features, such as the roughness of machined metal parts and the air bearing surface (ABS) of computer head sliders. Therefore, when environmental factors affect the initial calibration of the interferometer that ensures this OPD/focus condition, the quality of the measurements deteriorates and testing is no longer reliable. If the location of zero OPD is shifted away from the objective's focal point (a condition that occurs when the reference mirror is out of focus), the modulation produced by the interferometric scan is reduced with the attendant loss of measurement precision, which in turn reduces the ability to control whether the parameter of interest is maintained within the desired specification.

This invention describes a mechanism and a process for the automated adjustment of the reference mirror in the objective so that re-focusing can be carried out automatically at predetermined periods during the operation of the instrument.

BRIEF SUMMARY OF THE INVENTION

The novelty of the invention lies in the use of a reference surface, preferably of the same kind as the samples measured for quality-control purposes, to develop an empirical relation between the measured values of a parameter of interest in the surface and the position of the reference mirror. The parameter of interest can be, for example, a measure of surface roughness, or the level of modulation produced by the measurements. The empirical relationship is obtained by repeating the measurement of the reference surface at different positions of the reference mirror so as to develop a parameter-value versus position plot that identifies the in-focus position of the reference mirror on the basis of parameter values, such as, if roughness is used, the maximum value of roughness. The reference mirror is then placed at such in-focus position and serial quality-control measurements of roughness or other parameters in the samples are carried out.

Upon the occurrence of a predetermined event, such as, for example, the completion of a predetermined number of measurements, the system is recalibrated automatically by measuring again the roughness of the original reference surface and, if the measured roughness does not correspond to the in-focus position of the reference mirror according to the original plot, by repeating the measurements to develop a new plot and a correspondingly new in-focus position for the reference mirror. Sample measurements are then resumed with the mirror placed at that new position.

Those skilled in the art will readily appreciate that the plot of parameter-of-interest versus reference-mirror-position for the reference surface can be carried out automatically by programming the same processor used to carry out VSI or PSI measurements. Therefore, the development of such an empirical relationship between the values of the measured parameter and mirror position enables the automated recalibration of the system to re-focus the mirror in automated fashion to correct drifts caused by environmental factors. Appropriate hardware may be added to conventional systems to monitor the occurrence of the quality-control event, to translate the reference mirror for calibration measurements and in-focus positioning, and to control the various process steps according to the invention.

It is also understood that variations of the process steps may be required to carry out the invention depending on the exact interferometric method used to measure parts. For example, VSI measurements do not require that the sample be placed in focus prior to the measurement because the measurement itself involves scanning the sample through focus. However, PSI measurements do require that the sample be placed substantially within the focal plane of the objective before phase shifting can be carried out. To that end, any conventional auto-focus mechanism can be used.

The so-called quality-control event can be any measure suitable for testing the occurrence of a reference-mirror position drift. For example, a sudden jolt that produced an unusual vibration of the interferometer could represent such an event, or an unacceptable change in ambient temperature or humidity level, or the passage of time (e.g., the beginning of a new work shift), or the completion of a predetermined number of sample measurements. The re-calibration could also be tied to a measurement of the parameter of interest at a value outside the normal expected range.

Various other aspects and advantages of the invention will become clear from the description that follows and from the novel features particularly recited in the appended claims. Therefore, to the accomplishment of the objectives described above, this invention consists of the features hereinafter illustrated in the drawings, fully described in the detailed description of the preferred embodiments, and particularly pointed out in the claims. However, such drawings and description disclose only some of the various ways in which the invention may be practiced.

BRIEF DESCRIPTION OF THE DRAWINGS

FIG. 3 is a flowchart of the steps of the invention when white-light interferometry measurements are involved.

FIG. 4 is a flowchart of the steps of the invention when PSI measurements are involved.

DETAILED DESCRIPTION OF THE INVENTION

The invention is a procedure for adjusting the position of the reference mirror of an interferometric objective relative to the objective lens in order to re-focus the mirror when necessary as a result of drifts caused by environmental effects. The procedure is based on the development of an empirical relationship between mirror position and the values of a measured parameter, such as roughness or modulation, wherein the relationship is used as an indicator of best focus. A plot reflecting such relationship is used periodically or at predetermined quality-control events, if necessary, to re-focus automatically the reference mirror during periods of repeated measurements preferably of the same type of part, such as the air-bearing surface (ABS) of a magnetic head or a light-emitting-diode (LED) component.

Figure 1:
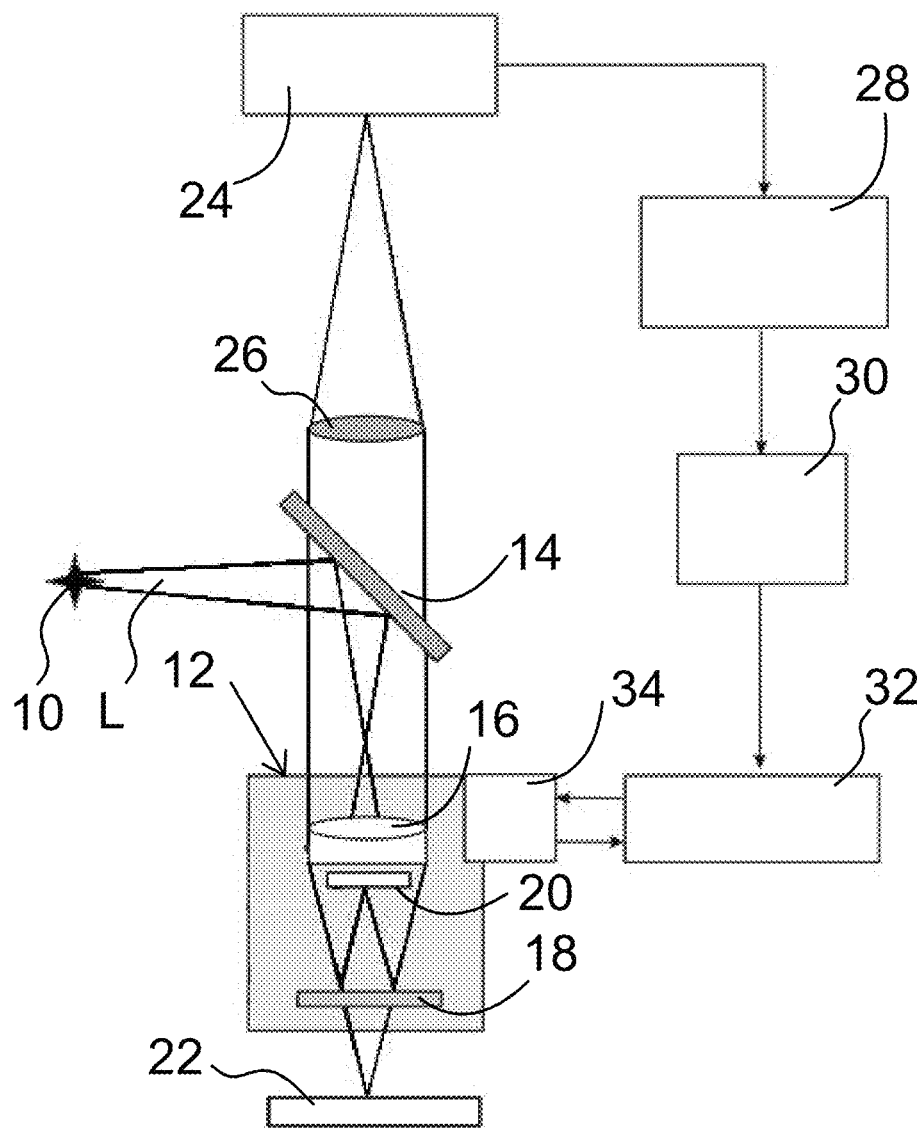
FIG. 1 illustrates schematically the configuration of a Mirau interferometric system.

The invention is applicable to any configuration of interferometric apparatus that includes a beam splitter propagating light toward a reference arm and a test arm. A Mirau configuration is used herein for illustration, but it is understood that the same approach could be applied to other interferometers. Referring to the figures, wherein like parts are referenced with the same numerals and symbols, FIG. 1 is a schematic representation of a conventional Mirau interferometer. A light source 10 emits a light beam L that is propagated toward a Mirau interferometric objective 12 by a beam splitter 14; the objective includes a focusing lens or optics 16, a beam-splitting plate 18 and a reference mirror 20. The light reflected by the reference mirror 20 and by a sample surface 22 is combined on axis and transmitted to a detector 24 through the splitter 14 and a focusing lens 26. The interference fringes produced at the detector 24 are recorded at predetermined intervals by a frame grabber 28 and transmitted to a computer 30 for processing. A controller 32, actuated by the computer, is used to drive a scanning mechanism 34 adapted to change the distance between the objective 12 and the sample surface 22 (or vice versa) for vertical-scan interferometric measurements.

The position of the reference mirror 20 relative to the focusing optics 16 is adjusted in conventional manner in order to ensure that the mirror is in focus, as illustrated in the figure. When environmental factors such as temperature changes, for instance, cause the mirror 20 to drift out of focus, a mechanism is usually provided to change the position of the mirror and bring it again into focus. This adjustment has been carried out manually in the art for lack of a criterion that enabled its automated implementation. Note that focusing of the reference mirror 20 is a separate and distinct requirement from focusing of the sample surface 22, which can be implemented either manually or automatically by tracking the quality of the sample image produced at the detector while scanning the objective 12 with the mechanism 34 relative to the sample surface 22 (or vice versa).

Figure 2:
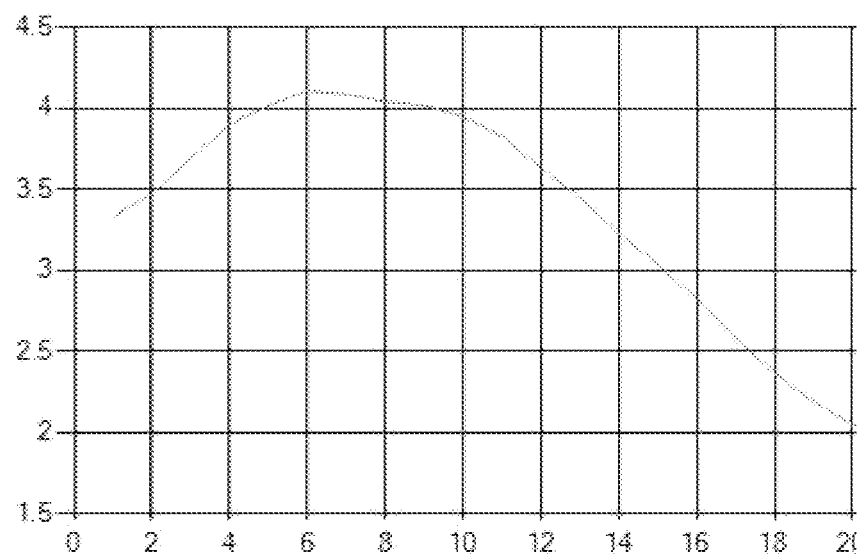
FIG. 2 is a curve that illustrates the relationship between roughness measured by VSI and the focal position of the reference mirror (that is, its position in relation to the objective's optics) in an ABS reference surface.

According to the invention, a standard sample surface (referred to herein as the "reference surface") is used to develop a calibration plot that enables the automated re-focusing of the reference mirror. The reference surface is preferably, but not necessarily, similar to the parts measured sequentially for quality-control purposes in a continuous production environment. A parameter of interest is selected to develop the plot; for example, roughness is of particular interest when measuring the ABS of a magnetic head and modulation (i.e., height) when measuring LEDs. If the measurement is carried out using white light, where modulation data are collected as the objective is scanned vertically through focus of the sample surface, the calibration plot of the invention is obtained by repeating the measurement of the reference surface as the distance between the reference mirror 20 and the optics 16 is changed. If roughness is being measured, a plot of roughness versus reference-mirror position will necessarily show a maximum where the mirror is in focus because that is when the vertical scan of the reference surface will produce the best measurement fringes, which in turn will yield the most precise information (less blurred) and therefore the largest measure of roughness. FIG. 2 shows one such plot for an ABS reference surface.

The curve in FIG. 2 shows that a maximum roughness Ra of about 4.2 nm corresponds to position 6 of the mechanism moving the reference mirror with respect to the objective's optics. That means that at that position the reference mirror was in its best focus and the corresponding vertical scan through the focal plane of the reference surface (the sample used to develop the plot) produced the best measurement at that reference-mirror setting. Therefore, that position of the reference mirror can thereafter be used to measure sample parts knowing that zero OPD will correspond to the in-focus position of both the sample surface and the reference mirror.

Given the fact that all steps involved in developing the plot of FIG. 2 can be carried out from numerical manipulation of information collected at the detector 24, this process can be carried out entirely in automated fashion when triggered by a predetermined criterion programmed into the system. For example, the procedure could be repeated periodically, such as at the beginning of each work shift, or after a predetermined number of measurements, or when ambient temperature/humidity/vibrations change by a predetermined amount, all of which can be tracked automatically with the necessary clock, counter or temperature/humidity/vibration gauge and implemented with algorithms processed by the computer 30.

Assuming, for example, that the interferometric device were programmed to re-focus the reference mirror periodically after each set of 1,000 consecutive measurements of the same part (the ABS of magnetic heads, for instance), the system would automatically replace the last measured part with the reference surface and repeat the measurement. If the resulting roughness were within an acceptable range of 4.2 nm Ra (using the data of FIG. 2 as an example), it would mean that the reference mirror 20 is still in focus and no further action would be required other than to start a new set of 1,000 part measurements. If, instead, the measured roughness were outside the acceptable range, it would mean that the reference mirror had drifted and is no longer in focus. Accordingly, the calibration procedure described above would be repeated with the reference surface and a new in-focus position determined for the reference mirror. FIG. 3 is a flowchart of the steps involved.

One skilled in the art will readily understand that the procedure of the invention is equally applicable to PSI measurements where the scan is limited to a few frames around the zero OPD position of the objective. Because PSI does not involve scanning through focus, for the purposes of this invention the only difference with respect to white-light interferometry is the fact that the objective 12 will need to be focused on the sample surface 22 before any PSI measurement is made. That is, to develop the plot of FIG. 2, the reference surface is first placed in focus using the conventional auto-focus mechanism for the instrument and a PSI measurement is taken for an initial reference-mirror position. Then the reference mirror is moved to a new position, the reference surface is again placed in focus using the scanning mechanism 34, and the PSI measurement is repeated; and so on until a plot of values of the parameter of interest versus mirror position is developed. FIG. 4 illustrates the process for a PSI application.

Figure 5:
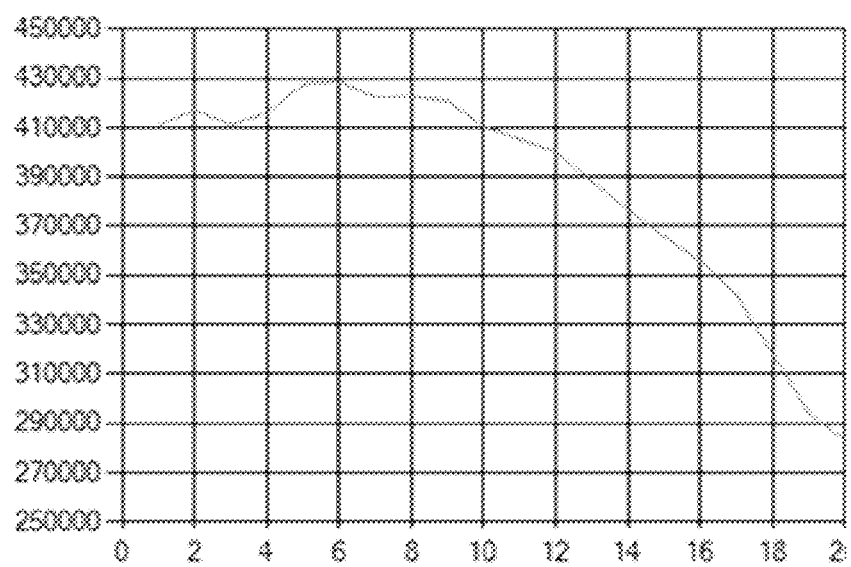
FIG. 5 is a curve that illustrates the relationship between modulation and the focal position of the reference mirror with the same ABS reference surface of FIG. 2.

It is understood that the quality-control event adopted to initiate the re-focusing calibration of the invention is arbitrary and it should be selected based on the operational requirements of each particular application. For instance, if an instrument is dedicated to the measurement of a single type of part (magnetic heads, for instance), the recalibration event could be triggered by a particular value measured for the parameter of interest itself, such as its roughness. Using the data of FIG. 2, for example, if the specification for the part included a roughness of 4.2 nm Ra±10%, the instrument could be recalibrated whenever one or more sequential measurements outside that range occurred. If modulation were measured, a calibration plot of modulation versus reference mirror position would be developed using the same steps of the invention and re-calibration could take place when a sample produced a series of modulation measurement outside a predetermined range. FIG. 5 is an example of the modulation (measured in arbitrary units) produced as a function of reference-mirror position by the same ABS measured for FIG. 2.

It is also anticipated that the correlation derived between the values of the measured parameter and the focal position of the reference mirror using the reference surface would be in most instances reliably correct also for the samples of interest if the same parameter were measured for quality-control purposes. In such case, the empirical plot could be used directly to provide the necessary reference-mirror adjustment via feedback. For example, if FIG. 2 were representative, in a repeatable manner, of the roughness measured on an ABS part as a function of reference-mirror position (4.2 nm corresponding to the in-focus condition), whenever successive measurements produced substantially uniform smaller results (3.5 nm, for example), the mirror could be adjusted via automatic feedback by an amount corresponding to the distance reflecting that change on the graph (i.e., between positions 6 and 12, assuming a drift to the right of focus, or 6 and 2 in the opposite direction—the direction would probably be consistent and could be determined empirically for a particular environment). If a subsequent measurement of the same part produced a measurement of about 4.2 nm (the value expected from a good part), that would mean that the reference mirror had drifted out of focus as assumed, the correction had worked, the part was good, and quality-control testing could resume without further adjustments. If the measurement instead still produced an out-of-specification result, it would mean that the part was not good, the correction was not necessary and should be reversed before resuming testing. Desirably, a monotonic relationship between the measured parameter and the reference-mirror position would remove any ambiguity in the choice of the direction in which to move the mirror to effect the correction, which would further facilitate a feedback implementation.

Figure 6:
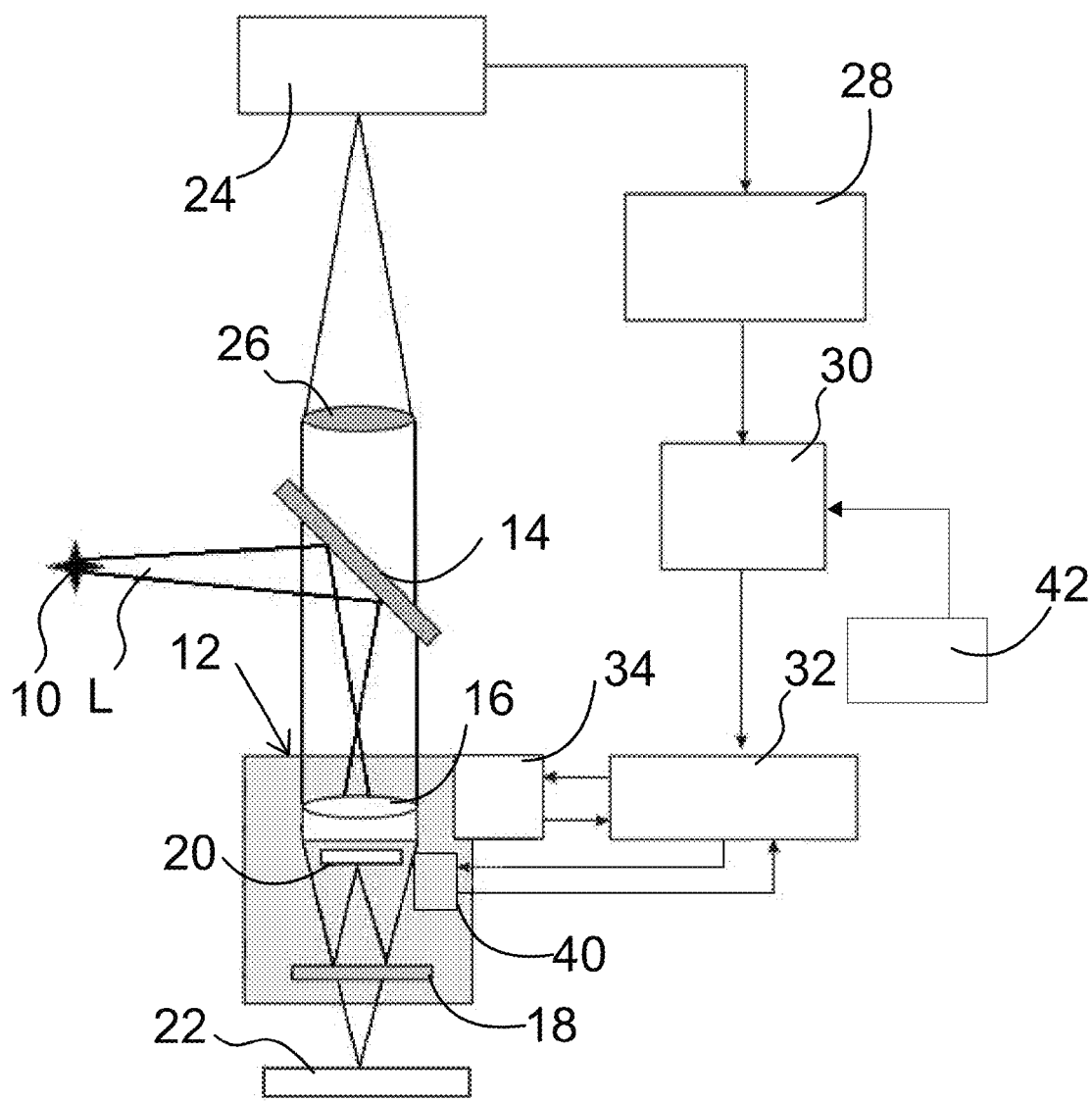
FIG. 6 illustrates schematically the configuration of a Mirau interferometric system modified according to the invention.

In practice, the process of the invention can be implemented with minor modifications to the conventional set-up of FIG. 1. As illustrated in FIG. 6, an additional translation mechanism 40 is added to the system to move the reference mirror 20 relative to the optics 16. In some systems, the beam splitter 18 is tied to the mirror 20, but, as it relates to the invention, the optical effect is the same. The scanner 40 can be driven by the same computer 30 and controller 32. A counter/sensor 42 provides the trigger for the computer 30 to start the re-calibration procedure outlined above based on the predetermined quality-control event, as described above. Appropriate software to implement the invention is programmed into the system's processor to carry out the process in automated fashion.

Figure 7:
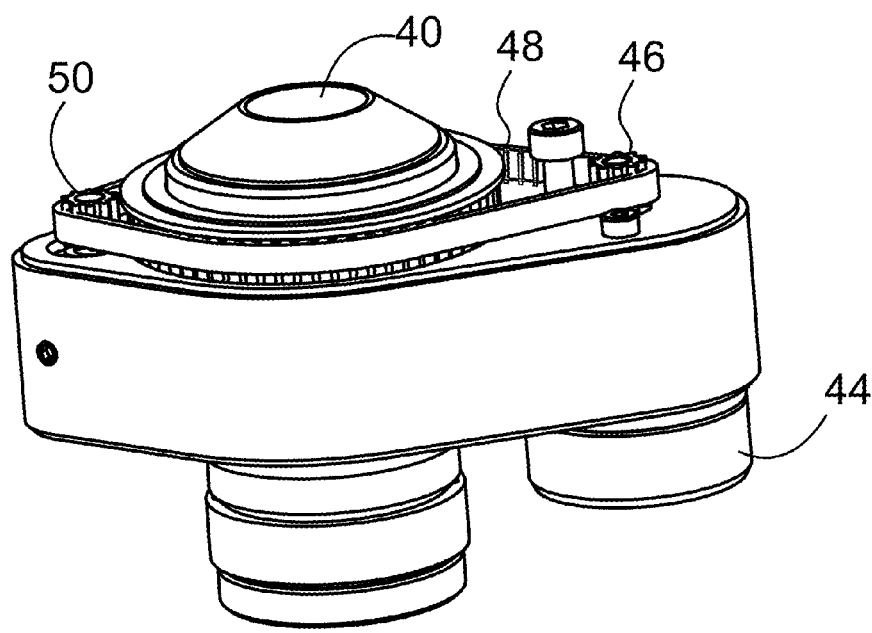
FIG. 7 is a view of an objective that includes a motor adapted to drive the translating mechanism used to re-calibrate the reference-mirror position according to the invention.

FIG. 7 illustrates an interferometric objective modified to provide the necessary automated translating mechanism for the reference mirror. The translating device 40 includes a motor 44 with a rotating output shaft 46 that drives the mechanism for focusing the reference mirror with a toothed belt 48. An eccentric idler 50 is used to tension the belt and prevent side loading of the focusing mechanism. The motor 44 may be rotary with a servo or stepper actuation, but a piezoelectric motor is preferred for its simplicity of operation and small-step resolution.

Thus, an approach has been described to refocus the reference mirror of an interferometric objective in automated fashion. A conventional system can be modified to implement it with considerable improvement in the efficiency of quality-control testing of parts.

Various changes in the details that have been described may be made by those skilled in the art within the principles and scope of the invention herein illustrated and defined in the appended claims. In particular, it is noted that the parameter measured to produce the empirical relationship with reference-mirror positions in the objective does not need to be the same as the parameter measured in the samples tested for quality-control purposes. In fact, though impractical, a new parameter and a correspondingly new empirical plot could be used each time re-focusing is necessary. Similarly, a different reference surface and/or a different instrument could be used when a new plot is developed, so long as the principles of the invention are subsequently implemented as taught herein. In essence, the development of the empirical plot representing the relationship between values of the measured parameter and the focal position of the reference mirror is substantially independent of the reference surface and the instrument used. That is, for example, if a given value of roughness corresponds to the in-focus position in one instrument, it can be assumed that it also does in another embodiment of the same instrument or in another similar instrument; and, in such cases, if a different value of roughness corresponds to a given distance from the in-focus position of the reference mirror, one could assume that that the same displacement would be present in the other instrument.

Therefore, once a plot is available, that same plot could be used in multiple instruments if the instruments and the environmental conditions are sufficiently similar and consistent to justify the assumption that the relationship between the focal position of the reference mirror and the value of the measured parameter of interest represented by the empirical plot is applicable to all instruments. Thus, while the invention has been shown and described in what are believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

We claim:

1. An interferometer comprising:
a light source;
a beam splitter optically coupled to the light source to produce a reference beam directed to a reference mirror and a test beam directed to a sample surface through an objective;
a scanning mechanism adapted to scan the objective relative to the sample surface;
a translating mechanism coupled to the reference mirror;
a motor driving the translating mechanism so as to enable focusing of the reference mirror;
a counter configured to monitor an occurrence of a predetermined event;
an automated controller connected to the motor; and
a processor configured to drive the controller;
wherein the processor is programmed to drive the controller so as to
a) measure a parameter of interest in a reference surface to develop an empirical relationship between positions of said reference mirror and values of a parameter of interest, wherein said relationship identifies an in-focus position of the reference mirror as a function of the parameter of interest;
b) place the reference mirror in said in-focus position;
c) perform measurements on a plurality of samples sequentially until the occurrence of said predetermined event; and
d) repeat steps a) and b) to recalibrate said in-focus position after the occurrence of the predetermined event.

2. The interferometer of claim 1, wherein the processor is further programmed to drive the controller, prior to said step d), so as to re-measure the parameter of interest in the reference surface upon said occurrence of the predetermined event; and
if, based on said empirical relationship, the value so measured corresponds to the in-focus position of the reference mirror, resume measurement of said plurality of samples; or
if, based on the empirical relationship, the value so measured corresponds to an out-of-focus position of the reference mirror, go to step d).

3. The interferometer of claim 1, wherein said predetermined event includes a measurement of said parameter of interest that produces a result outside an acceptable range; and wherein the processor is further programmed to drive the controller, prior to said step d), so as to re-measure the parameter of interest in the reference surface upon said occurrence of the predetermined event; and
if, based on said empirical relationship, the value so measured corresponds to the in-focus position of the reference mirror, resume measurement of said plurality of samples; or
if, based on the empirical relationship the value so measured corresponds to an out-of-focus position of the reference mirror, reposition the reference mirror to a new in-focus position based on said empirical relationship between positions of the reference mirror and values of the parameter of interest.

4. An interferometer comprising:
a light source;
a beam splitter optically coupled to the light source to produce a reference beam directed to a reference mirror and a test beam directed to a sample surface through an objective;
a scanning mechanism adapted to scan the objective relative to the sample surface;
a translating mechanism coupled to the reference mirror;
a motor driving the translating mechanism so as to enable focusing of the reference mirror;
a sensor configured to monitor an occurrence of a predetermined event;
an automated controller connected to the motor; and
a processor configured to drive the controller;
wherein the processor is programmed to drive the controller so as to
a) measure a parameter of interest in a reference surface to develop an empirical relationship between positions of said reference mirror and values of a parameter of interest, wherein said relationship identifies an in-focus position of the reference mirror as a function of the parameter of interest;
b) place the reference mirror in said in-focus position;
c) perform measurements on a plurality of samples sequentially until the occurrence of said predetermined event; and
d) repeat steps a) and b) to recalibrate said in-focus position after the occurrence of the predetermined event.

5. The interferometer of claim 4, wherein the processor is further programmed to drive the controller, prior to said step d), so as to re-measure the parameter of interest in the reference surface upon said occurrence of the predetermined event; and
if, based on said empirical relationship, the value so measured corresponds to the in-focus position of the reference mirror, resume measurement of said plurality of samples; or
if, based on the empirical relationship, the value so measured corresponds to an out-of-focus position of the reference mirror, go to step d).

6. The interferometer of claim 4, wherein said predetermined event includes a measurement of said parameter of interest that produces a result outside an acceptable range; and wherein the processor is further programmed to drive the controller, prior to said step d), so as to re-measure the parameter of interest in the reference surface upon said occurrence of the predetermined event; and
if, based on said empirical relationship, the value so measured corresponds to the in-focus position of the reference mirror, resume measurement of said plurality of samples; or
if, based on the empirical relationship the value so measured corresponds to an out-of-focus position of the reference mirror, reposition the reference mirror to a new in-focus position based on said empirical relationship between positions of the reference mirror and values of the parameter of interest.

7. An interferometer comprising:
a light source;
a beam splitter optically coupled to the light source to produce a reference beam directed to a reference mirror and a test beam directed to a sample surface through an objective;

a scanning mechanism adapted to scan the objective relative to the sample surface;

a translating mechanism coupled to the reference mirror;

a motor driving the translating mechanism so as to enable focusing of the reference mirror;

a gauge configured to monitor an occurrence of a predetermined event;

an automated controller connected to the motor; and a processor configured to drive the controller;

wherein the processor is programmed to drive the controller so as to a) measure a parameter of interest in a reference surface to develop an empirical relationship between positions of said reference mirror and values of a parameter of interest, wherein said relationship identifies an in-focus position of the reference mirror as a function of the parameter of interest;

b) place the reference mirror in said in-focus position;

c) perform measurements on a plurality of samples sequentially until the occurrence of said predetermined event; and d) repeat steps a) and b) to recalibrate said in-focus position after the occurrence of the predetermined event.

8. The interferometer of claim 7, wherein the processor is further programmed to drive the controller, prior to said step d), so as to re-measure the parameter of interest in the reference surface upon said occurrence of the predetermined event; and if, based on said empirical relationship, the value so measured corresponds to the in-focus position of the reference mirror, resume measurement of said plurality of samples; or if, based on the empirical relationship, the value so measured corresponds to an out-of-focus position of the reference mirror, go to step d).

9. The interferometer of claim 7, wherein said predetermined event includes a measurement of said parameter of interest that produces a result outside an acceptable range; and wherein the processor is further programmed to drive the controller, prior to said step d), so as to re-measure the parameter of interest in the reference surface upon said occurrence of the predetermined event; and if, based on said empirical relationship, the value so measured corresponds to the in-focus position of the reference mirror, resume measurement of said plurality of samples; or if, based on the empirical relationship the value so measured corresponds to an out-of-focus position of the reference mirror, reposition the reference mirror to a new in-focus position based on said empirical relationship between positions of the reference mirror and values of the parameter of interest.

\* \* \* \* \*